Patented Feb. 10, 1953

2,628,253

UNITED STATES PATENT OFFICE 2,628,253

FLUOROCARBON ACYL SULFURIC ACIDS

John F. Dowdall, St. Paul, Minn., assignor to Minnesota Mining & Manufacturing Company, St. Paul, Minn., a corporation of Delaware No Drawing. Application May 19, 1951, Serial No. 227,269

2 Claims. (Cl. 260—545)

This invention relates to a new series of compounds consisting of the fluorocarbon acyl sulfuric acids and to a process for making them.

In particular, this invention concerns fluorocarbon acyl sulfuric acids of the formula:

$$R_fCOSO_3H$$
$$\parallel$$
$$O$$

where $R_f$ is a saturated fluorocarbon group (consisting solely of carbon and fluorine), and a process for making them involving the reaction of saturated fluorocarbon mono-carboxylic acids with sulfur trioxide, $SO_3$.

Of particular interest are the perfluoro-alkyl acyl sulfuric acids of the formula:

$$C_nF_{2n+1}COSO_3H$$
$$\parallel$$
$$O$$

where $n$ has an integer value of 1 to 3.

Acetyl sulfuric acid $$CH_3COSO_3H$$
$$\parallel$$
$$O$$

has been prepared by the reaction of acetic acid with $SO_3$. However, reaction temperatures below 0° C. must be used since at higher temperatures, the compound rearranges to form sulfoacetic acid, $HO_3SCH_2COOH$. (See General Chemical Co. Technical Service Bulletin SF-1, p. 9). Likewise, it is reported in the same reference that the higher acyl sulfuric acids, i. e., propionyl and butyryl sulfuric acids, are formed at 0° C. by the same process, only to rearrange to the corresponding alpha sulfo acids at higher temperatures. The reaction of $SO_3$ with n-valeric acid is said to produce a 29% yield of the di-alpha sulfo-n-valeric acid.

In contrast, the fluorocarbon acyl sulfuric acids are sufficiently stable so that the lower molecular weight acids such as perfluoroacetyl, perfluoropropionyl, and perfluorobutyryl sulfuric acids are capable of being distilled. Further, these compounds do not rearrange to form undesirable side products such as the sulfo acids described above.

The fluorocarbon acyl sulfuric acids react vigorously with water and alcohol to form the corresponding perfluoro acids and esters, respectively, and sulfuric acid.

Of particular utility is the reaction between the fluorocarbon acyl sulfuric acids and the appropriate perfluoro acids to form the corresponding acid anhydrides in exceptionally good yields.

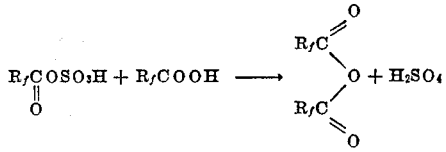

As will be noted later, it is not necessary to isolate the perfluoro acyl sulfuric acid during preparation of the perfluoro acid anhydride.

Preparation of the fluorocarbon acyl sulfuric acids proceeds readily as indicated by the following description of the standard method used in preparing the various acids:

To one mole of a saturated fluorocarbon mono-carboxylic acid is added one mole of liquid $SO_3$ ("Sulfan B" from General Chemical Co. has been used in our experiments). The mixture is heated one hour at 50° C., then cooled. Distillation of the product is conducted in vacuo.

Perfluoroacetyl sulfuric acid, $CF_3COOSO_3H$, thus prepared distilled at 40–2° C./30 mm. Titrimetric analysis of a mixture obtained by reaction of the compound with water showed an equimolar ratio of perfluoroacetic acid and sulfuric acid to exist.

As an example of the higher fluorocarbon acyl sulfuric acids, perfluorobutyryl sulfuric acid, $CF_3CF_2CF_2COOSO_3H$, was prepared and found to boil at 51–53° C. at 30 mm.

These fluorocarbon acyl sulfuric acids are easily reacted with perfluoro acids as indicated by the following experimental procedure used throughout this work.

One mole of $SO_3$ is added to two moles of the appropriate saturated fluorocarbon mono-carboxylic acid with cooling by means of cold water. The corresponding perfluoro acid anhydride is obtained in excellent yields by distillation through a short column. In fact, the lower molecular weight anhydrides such as perfluoroacetic and perfluorobutyric anhydrides were obtained in yields approaching theory. The formation of the anhydride is such that a continuous process for its production is possible.

I claim:

1. As useful and novel compounds, the perfluoroalkyl acyl sulfuric acids having the formula:

$$C_nF_{2n+1}COSO_3H$$
$$\parallel$$
$$O$$

where $n$ has an integer value of 1 to 3.

2. The new compound perfluoroacetyl sulfuric acid, having the formula: $CF_3COOSO_3H$.

JOHN F. DOWDALL.

REFERENCES CITED

The following references are of record in the file of this patent:

FOREIGN PATENTS

| Number | Country | Date |
|---|---|---|
| 12,130 | Great Britain | May 24, 1913 |

OTHER REFERENCES

Van Peski, Chem. Abs., vol. 15, p. 3455 (1921).